May 26, 1925.  
G. C. THOMSON  
BOTTLE WASHING MACHINE  
Filed Aug. 6, 1920
1,539,031
10 Sheets-Sheet 1
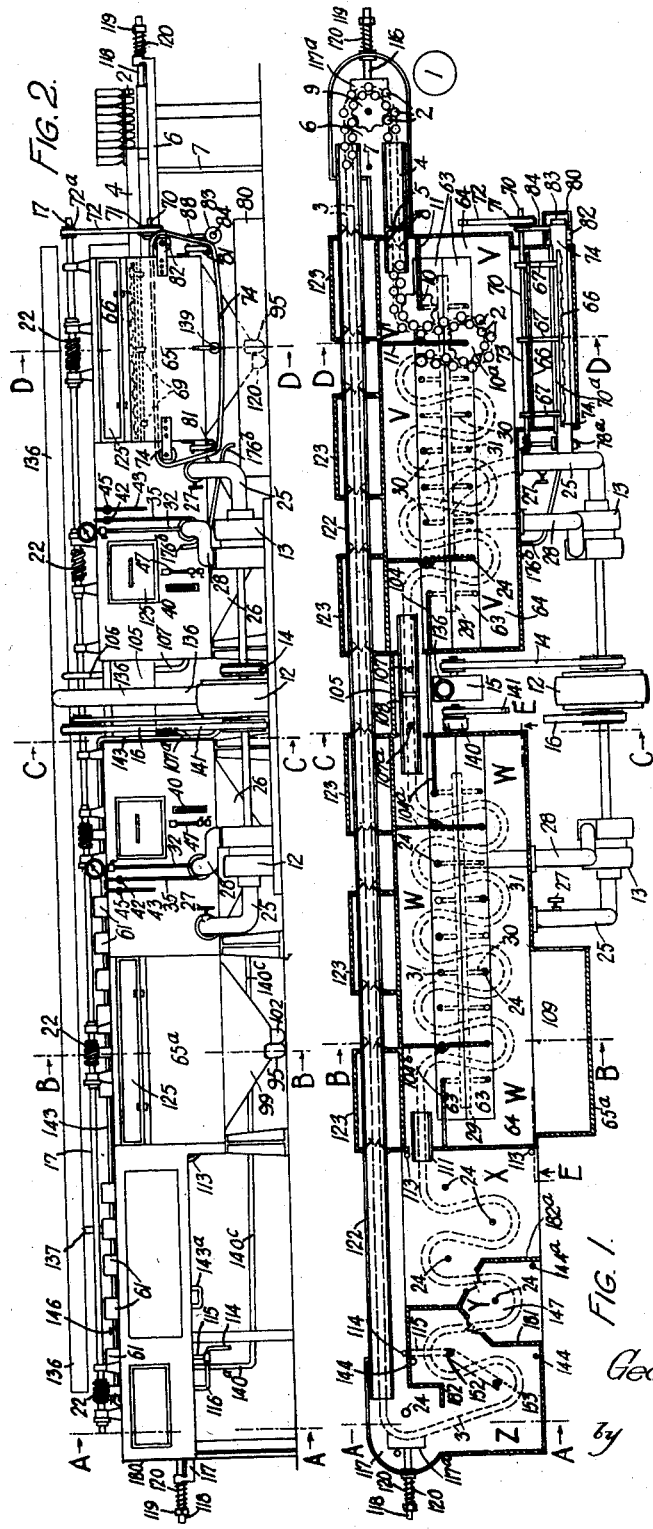
Inventor  
George Craig Thomson  
by B. Bingley  
Attorney

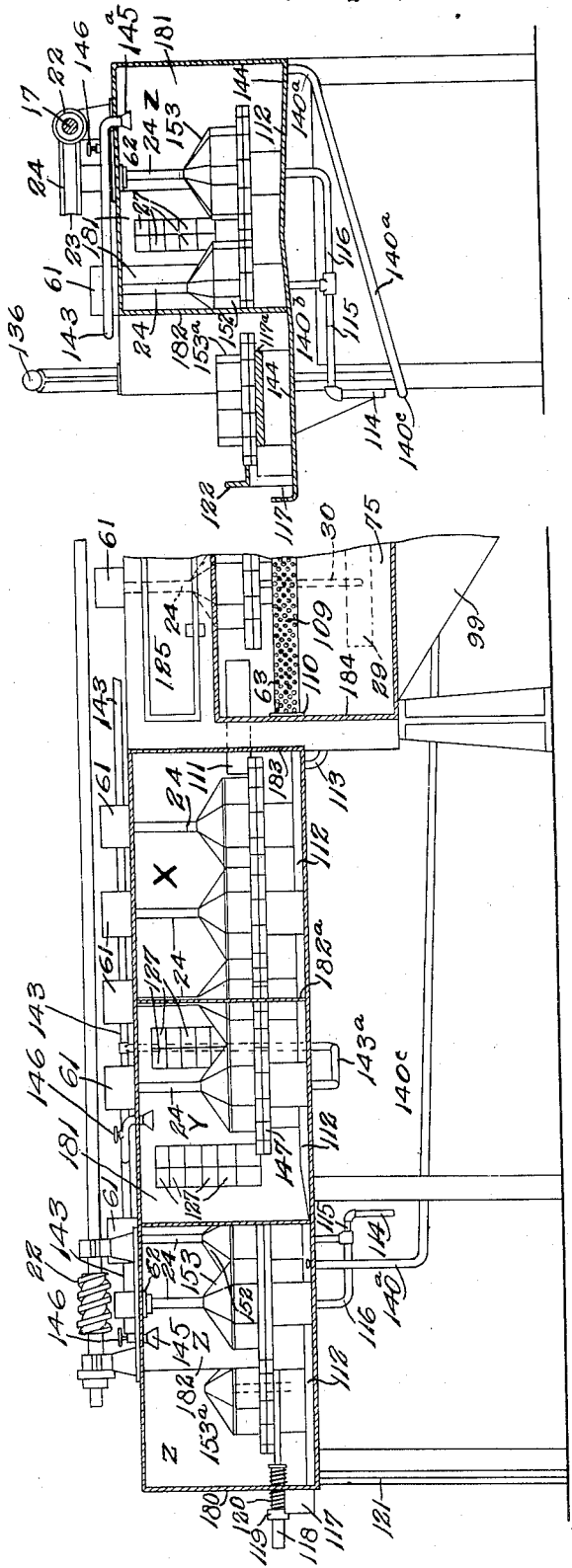

May 26, 1925.

G. C. THOMSON 1,539,031

BOTTLE WASHING MACHINE

Filed Aug. 6, 1920

Inventor
George Craig Thomson by

Bingly
Attorney

May 26, 1925.  1,539,031
G. C. THOMSON
BOTTLE WASHING MACHINE
Filed Aug. 6, 1920   10 Sheets-Sheet 4
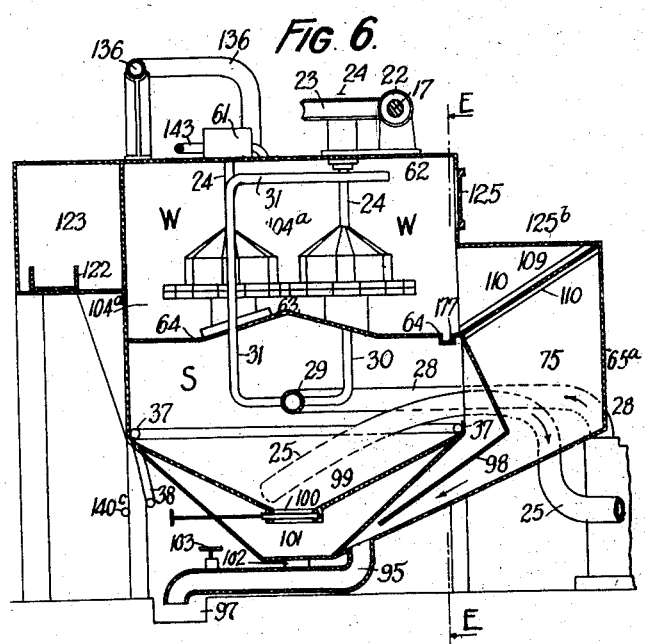
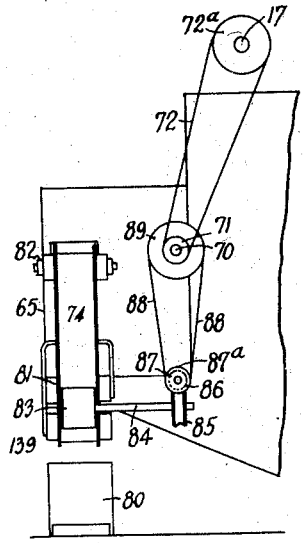
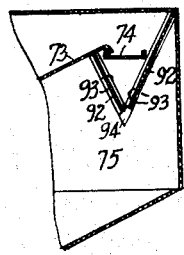
Inventor
George Craig Thomson
by
Attorney

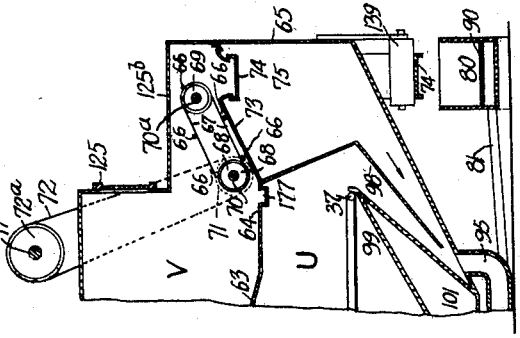

May 26, 1925.

G. C. THOMSON 1,539,031

BOTTLE WASHING MACHINE

Filed Aug. 6, 1920     10 Sheets-Sheet 6

Inventor
George Craig Thomson by

Attorney

May 26, 1925. 1,539,031

G. C. THOMSON

BOTTLE WASHING MACHINE

Filed Aug. 6, 1920 10 Sheets-Sheet 7

Inventor
George Craig Thomson
by
Attorney

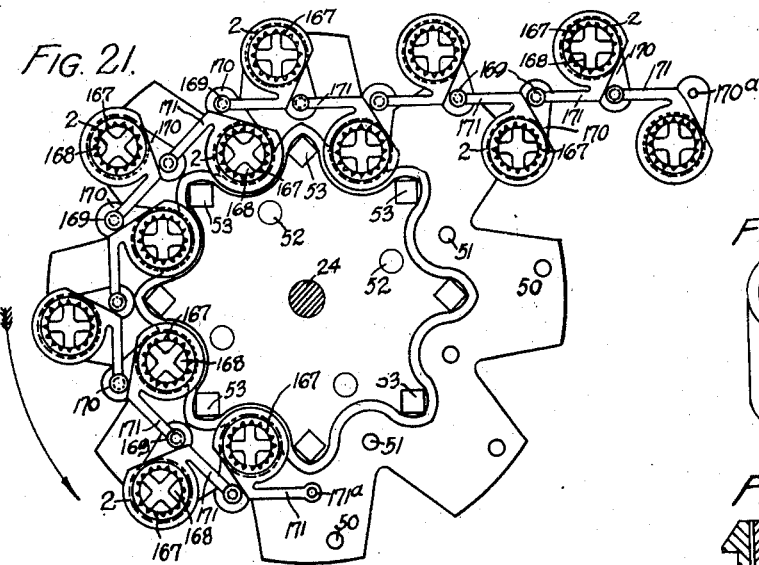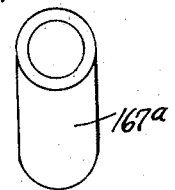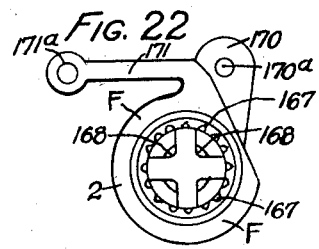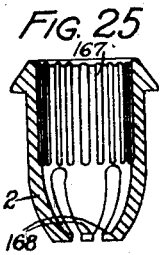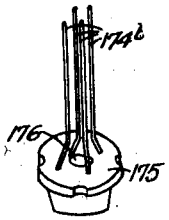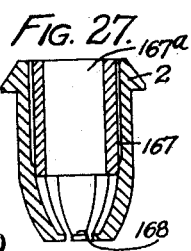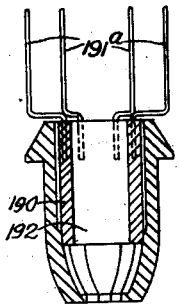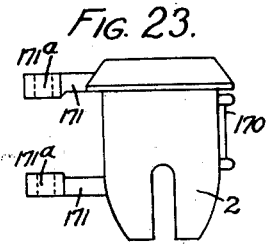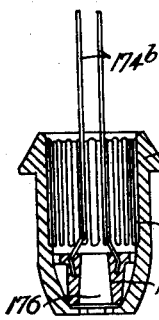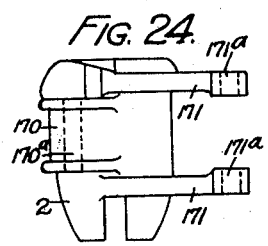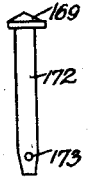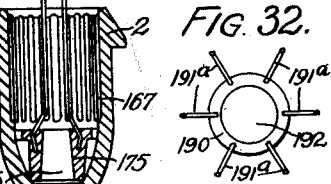

May 26, 1925.  
G. C. THOMSON  
BOTTLE WASHING MACHINE  
Filed Aug. 6, 1920    10 Sheets-Sheet 9
1,539,031
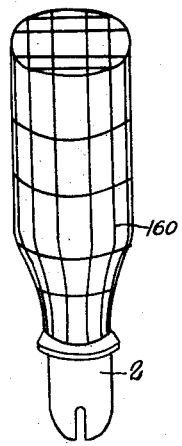
FIG. 33.
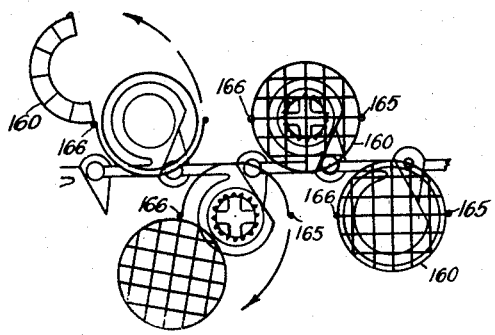
FIG. 34.
FIG. 37.
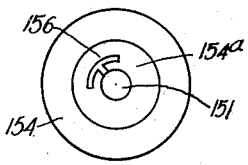
FIG. 38.    FIG. 36.
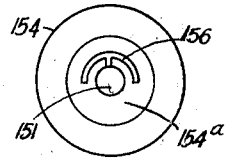
FIG. 35.
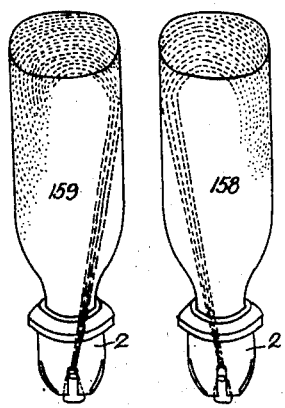
FIG. 41A.   FIG. 41B.   FIG. 41.
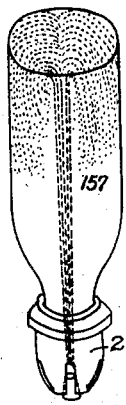
FIG. 42.    FIG. 43.
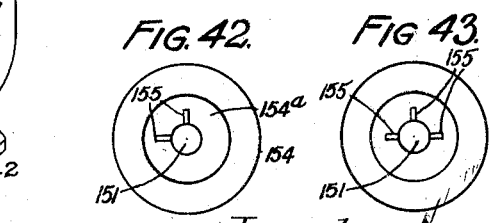
Inventor  
George Craig Thomson  
by  
Attorney Inventor
George Craig Thomson
by
Attorney Patented May 26, 1925.

1,539,031

UNITED STATES PATENT OFFICE.

GEORGE CRAIG THOMSON, OF DUNEDIN, NEW ZEALAND.

BOTTLE-WASHING MACHINE.

Application filed August 6, 1920. Serial No. 401,820.

*To all whom it may concern:*

Be it known that I, GEORGE CRAIG THOMSON, of 75 Taieri Road, Roslyn, city of Dunedin, New Zealand, a subject of the King of Great Britain, have invented certain new and useful Improvements in Bottle-Washing Machines, of which the following is a specification.

This invention relates to improvements in a method of cleansing containers and particularly to an apparatus for carrying out the method.

An object of the invention is to subject the containers prior to the filling successively to different operations whereby they are thoroughly washed on the inside and outside and whereby all labels, papers, or other articles which have been attached to the containers are removed.

Another object of the invention is to continuously convey the containers supported in a position in which the various operations can be carried out through different chambers containing different washing fluids.

It is also an object of the invention to inject the cleansing solutions or fluids in these chambers into the various containers and against the outside thereof while the containers are in a predetermined position.

The invention also contemplates to guide the conveyor for the containers in a serpentine path through the machine and to spray the containers intermittently with the fluid while they are traveling through a predetermined portion of their path.

In combination with the method of cleaning the bottles, the invention also contemplates the step of removing the unclean matter, drained or otherwise withdrawn from the containers, and to effect this removal of the unclean matter, impurities, labels, etc., without interrupting the travel of the containers.

The method, therefore, may generally be stated to comprise the successive steps of draining the unclean containers of any internal contents, gently and gradually warming and washing the same with a hot solution internally and externally, and freeing them at the same time from labels, then removing the first washing fluid which has become mixed or which has received in solution the adhesive whereby the labels were attached, and effecting this freeing by air blast; then sterilizing the containers with a sterilizing solution at higher temperature and removing the traces of this sterilizing solution from the bottles by air, cooling the hot containers by blasts of cooled air on the inside and outside, rinsing them after they have been cooled with cold water, continuing this rinsing with a second charge of clean cold water, removing the residues of this rinsing water by blasts of air, and finally heating the dried containers. They may then be discharged or removed from the machine while they are in fairly hot, completely cleaned, and dried condition.

The invention also contemplates improvements in the construction of the conveyor adapted to carry the entire series of containers successively through the various portions of the machine in which the different washing or drying devices are installed and to return the containers after these operations to the starting position, or to permit the removal of the containers by hand or in any other way.

The supports for the individual containers form links of the conveyor and are constructed to maintain the same in central position. These supports also permit of the insertion of suitable parts, whereby bottles or containers of different shape may be carried without requiring an alteration in the entire construction of the conveyor or its links.

In connection with the washing and sterilizing devices of the machine, the invention contemplates the provision of means for permitting the re-utilization of the fluids after, however, these fluids have been freed from the impurities which by these fluids themselves are washed or otherwise removed from the bottles.

It is furthermore an object of the invention to provide rotary supports or wheels on which the cleansing operations are carried out, these supports thereby serving as guides or sprocket wheels for the chain of containers and at the same time serving as fountain wheels or nozzle supports through which the cleansing solution is sprayed into the interior of the containers.

With these and numerous other objects in view, embodiments of a machine suitable for carrying out the method are described in the following specification and illustrated in the accompanying drawings, the novel features of the improved method and machine being pointed out in the appended claims.

In the drawings:

Fig. 1 is a top plan view, showing the machine diagrammatically;

Fig. 2 is a diagrammatical front elevation of the machine corresponding to Fig. 1;

Fig. 3 is a front elevation of the left-hand end of the machine shown on a larger scale and with certain front walls removed to permit inspection of the interior of the pre-rinsing and final rinsing chamber;

Fig. 4 is a sectional view similar to Fig. 3, taken on E—E of Fig. 1 and also on line E—E of Fig. 6;

Fig. 5 is a transverse section on A—A of Fig. 1 through a rinsing compartment;

Fig. 6 is a sectional view on line B—B of Fig. 1 through the compartment for sterilization;

Fig. 7 is a sectional view on line C—C of Fig. 1, and end elevation of a casing showing transmission devices;

Fig. 8 is a sectional view on line D—D of Fig. 1, illustrating the label removing device;

Fig. 9 is an end view of the label removing casing and showing the driving mechanism for the same;

Fig. 15 is a modified diagrammatic section of the casing part in which the labels are removed;

Fig. 21 is a top plan view of one of the wheels over which a portion of the conveyor chain is trained;

Fig. 22 is a top plan view of one of the links of this chain and individual supports for the container;

Fig. 23 is a rear view of the same;

Fig. 24 is a front elevation of the same;

Fig. 25 is a sectional view on line F—F of Fig. 22 through the same;

Fig. 26 is an elevation of the hinged pin for the link;

Fig. 27 is a sectional view similar to Fig. 25, showing a sleeve insertion;

Fig. 28 is a perspective view of this sleeve;

Fig. 29 is a sectional view, similar to Fig. 25, showing the cup combined with a holding device for a valve member in a bottle;

Fig. 30 is a perspective view of this holding member;

Fig. 31 is a sectional view similar to Fig. 25 combined with a frame for holding larger bottles;

Fig. 32 is a top plan view of this inserted frame;

Fig. 33 is a perspective view of a wire cage for a bottle in combination with one of the supports;

Fig. 34 illustrates in diagrammatic top plan view several bottles with their wire cages in opened and closed position;

Fig. 35 is a detail perspective view of spring-controlled gates through which the bottles pass;

Fig. 36 is a top plan view of the stationary seat for some of the sprocket fountain wheels;

Fig. 37 is a section through the same seat;

Fig. 38 is a top plan view similar to Fig. 36, of a modified seat for other sprocket fountain wheels;

Figs. 41, 41a and 41b illustrate in perspective view diagrammatically the direction of different jets emanating from the nozzles to thoroughly cleanse the interior of the containers;

Fig. 42 is a top plan view similar to Fig. 36 of the seat of the first sprocket fountain wheel over which the chain of containers is guided, and Fig. 43 is a similar view of the second sprocket fountain wheel over which the chain is guided.

Figure 10:
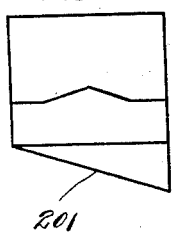
Fig. 10 is a diagrammatical sectional illustration of a modified bottom arrangement for a casing.

In general the machine comprises a number of casings, which are preferably made of sheet metal or the like, and which are subdivided into compartments, these casings being arranged at a suitable height from the bottom to facilitate the operation and inspection of the entire machine. The conveyor for carrying the containers is guided in a serpentine path through all of these compartments and the partition walls therefor, separating the various casings or compartments from each other, may be provided with doors which are opened automatically by the chain and container supported thereby. The various links of this conveyor chain, which will be described in detail below, are indicated at 2, while the dotted lines 3 indicate the path of this chain through the different compartments of the machine.

A table 6, at the right hand end of the machine housing, carries a channel 4, which is provided with openings (not shown) to permit the left-over portions of liquids or dregs to drip from the inverted bottles to the table, from where they are discharged through the waste pipe 7. A low baffle 5 in the channel 4 serves for preventing the fluid in the channel from running into the housing. Hinged self-closing gates 8, preferably of the construction illustrated in Fig. 35, prevent the escape of air, moisture or steam in general from the interior of the housing.

The housing, as shown, includes two large casings, which are separated from each other, and which are preferably made of rust proof sheet metal. Each casing, again, is divided into a number of compartments through which the conveyor passes successively in a serpentine path.

The compartment V, into which the conveyor first enters, contains a sprocket wheel 10, which is positively driven, and the details of which are described below. It will be seen that the conveyor is in engagement with about one-fourth of the circumference of this wheel. This sprocket wheel at the same time, however, is equipped with nozzles through which moisture in the form of a spray is introduced into the interior of the containers and sprays are also directed against the outer surface of these containers.

As shown diagrammatically in Fig. 1, the sprocket wheels are alternately located at opposite sides of a central axial line of the casing but not in direct opposition to each other whereby the container chain is compelled to travel in a serpentine path.

Owing to the introduction of a warm spray into the containers and through the heated moist atmosphere in the compartment, the containers are prewarmed before entering the washing and soaking compartment proper.

The first compartment, in which the two sprocket fountain wheels 10 and 10ª serve for advancing the chain, is provided with perforated baffle walls 11 permitting the moisture arising from the heated washing fluid in the next compartment to pass into the first compartment and to contribute to the pre-warming of the containers, while at the same time a cleansing fluid is introduced into them.

The next compartment into which the containers are conveyed serves for thoroughly warming, soaking, and washing the containers. This compartment also is equipped with a number of nozzle sprocket wheels of a construction similar to those in the first compartment. This compartment is separated from the next compartment by walls 104 leaving a passageway for the conveyor with the containers thereon.

A cross-section of the compartments is illustrated, for instance, in Fig. 6, where one of them is shown to be substantially rectangular, having, however, a bottom which is formed by a ridge constituted by two outwardly inclined longitudinal extending bottom portions 63 and by horizontal portions 64.

Heated washing fluid of about 120° F. is conveyed into this casing, comprising the compartments described through a pump 13, which is positively driven by a motor 12 of some suitable kind, and which has a conduit 28 communicating with a longitudinally disposed pipe 29 below the bottom plates 63, 64, the fluid being returned through a pipe 25 to the pump 13. At suitable distance from each other transverse pipes 30 and 31 extend from the longitudinal main conduit 29 within the casing and these branches 30 and 31 are continued upwardly, the pipe 30 serving for conducting the washing fluid into the fountain sprocket wheels, while the other pipe 31, opposing each branch 30, is extended upwardly and then transversely to terminate approximately directly above the outer portion of the opposite sprocket wheel.

From the compartment in which the containers are once more thoroughly washed on the inside and outside, the conveyor travels through a box shaped tunnel 105 (Fig. 7) to the other part or second casing W also containing several compartments in which a second cleansing of the containers is effected through a sterilizing fluid which is introduced through the nozzles of similar fountain sprocket wheels and the construction of the bottom comprising the ridge portions 63 and the flat portions 64 is the same as in the first casing. It will also be noted that in this second casing the sterilizing fluid is circulated through another pump 13 of a construction which may be identical with the first pump, a pipe 28 again terminating in a longitudinal main pipe 2 in the casing and the used fluid being returned to the pump by means of the pipe 25, which also contains the hand or regulating valve 27. Here also a number of sprocket wheels serve for advancing the chain in a serpentine path through the entire casing and through the various compartments of this casing, although these sprocket wheels are not shown.

The various compartments are separated from each other by baffles or partition walls 104ª and 104ᵇ, respectively, and branches 30 and 31 extending from the longitudinal main pipe 29 serve for conducting the cleansing fluid to the several fountain sprocket wheels.

A short connecting box or tunnel serves for supporting the chain of receptacles while they are conducted through the wall 183, which forms a closure for this second large casing.

After their passage through this conducting tunnel the containers enter the compartment X, formed by the walls 182ª and by open front and rear walls, and during the passage through this compartment the bottles are exposed to the influence of air coming from compresser or blower 15, which receives its drive from the motor 12 through the belt 14. An air conduit 136 communicates with this pump 15 and extends longitudinally over the machine, the air from this conduit being introduced into the compartment X through the pipe 137.

Passing from the compartment X through a spring-controlled gate similar to that illustrated in Fig. 35 into the compartment Y, the containers are pre-rinsed on the outer surface as well as on their inner surface by clean warm water introduced through the pipe 143, which is in communication with a warm water pump 140 (Fig. 1) driven by the belt 141. The compartment Y is confined by walls 181 and 182ª.

The rinsing is continued in the compartment Z, to which the water is conducted through the pipe 144, and after having been thoroughly rinsed the containers travel over a sprocket wheel 153ª and enter a channel 122, through which the entire chain is conducted back to that part of the machine at which the containers have been placed on the chain.

During this return travel through the channel 122 the containers pass through one or more compartments 123, wherein they are heated by radiation from the adjacent compartments so that the bottles are dried and in dried condition may then be removed either near the point of introduction into the device or between each two of the several compartments 123 from the chain. The containers are then ready for the bottling or filling operation.

In connection with the two large casings through which the containers travel, front extensions 65 and 65ª, respectively, are provided, these extensions communicating with the interior of the large compartments and being provided with means for removing the waste, as labels, corks, caps, etc., that is washed from the bottles and for separating this waste from that water or other cleansing fluid which again is recirculated through the machine.

The casings are accessible through doors 125, which are on the front walls, while the extensions 65 and 65ª may be made accessible by removal of the top walls 125ᵇ.

The drive mechanism for the machine includes a main motor 12, the shaft of which is continued beyond the sides to drive the two pumps 13. Another transmission belt 16 is trained over a pulley of this motor and over a pulley 18 on a shaft 17 extending over practically the entire length of the machine and being at intervals provided with worm gears 22 in engagement with worms 23 (Figs. 5 and 7) at the top end of vertical shafts 24, on which the various fountain sprocket wheels are secured within the casings. Several of these wheels may be driven positively from the shaft 17, while others act as guiding sprockets or idlers and are rotated by the advance of the conveyor chain 3 around them.

The shafts 24 for these idler sprockets are supported on top of the casings in suitable bearings 61, while differently constructed bearings 62, projecting into the casings, support the shafts of the sprocket wheels, which are directly driven by the worm gears.

The drive of the mechanism for conveying the waste out of the casings through the extension 65 is shown in Figs. 1, 2 and 7. A pulley 72ª at the end of the shaft 17 drives by means of a belt 72 another pulley 71 at the outer end of a shaft 70 (Figs. 1 and 2), which shaft extends through the extension. The other end of this shaft carries a worm 76 in engagement with a worm gear 77 on a shaft 78. A pulley 78ª on this shaft serves for supporting a conveyor belt 74 upon which the impurities are thrown.

The equipment of the machine furthermore comprises on the two casings a thermometer 40, a water-level indicator 47, and a pressure meter connected by a pipe 32 with the pump conduit 28. This pipe contains a hand valve 33. A supply pipe for the pump 13 is indicated at 35 and is provided with a valve 42, while another pipe 44 with a valve 45 may be used for supplying air to the casings.

The construction of the casings in detail is shown in Fig. 6, in connection with an extension through which waste material may be removed from the casing. A gutter 177, located adjacent a flat bottom portion, carries waste material outwardly through a pipe 176 (Figs. 13 and 14) communicating with an outlet 176ᵇ.

A steam pipe 37 in the interior of each casing and located below the bottom of the same receives steam through a pipe 38 from some suitable source for maintaining the compartments at proper temperature. The casings are furthermore equipped adjacent the extensions 65 and 65ª with a sump 99, having inclined bottom walls and a gate valve 100 at its central portion. Another sump 101 below the sump 99 may receive the fluid from the upper sump. The gate valve 100 is kept open while the machine is running to permit the heavy trash collected in the chamber 101 to be drawn off through the discharge pipe 102. Another pipe 95, communicating with the extensions 65, opens into a gutter 97. This discharge pipe is equipped with a valve 103. A partition wall 98 is interposed between the front wall of the respective casing and the sloping bottom of the extension 65 or 65$^a$. A manhole 128 (Fig. 7) permits access to the interior for cleaning or repair purposes.

The material in the extension flows down on the sloping bottom of the extension and the cleansing fluid rises above the baffle wall 98 and again enters the sump 99, from which it is conducted back through the pipe 25 into the pump 13. The trash, which is heavier than the fluid, does not rise above the baffle 98, but flows directly into the discharge pipe 95 and enters the gutter 97.

Modifications of this arrangement are illustrated diagrammatically in Figs. 10–14.

Figure 11:
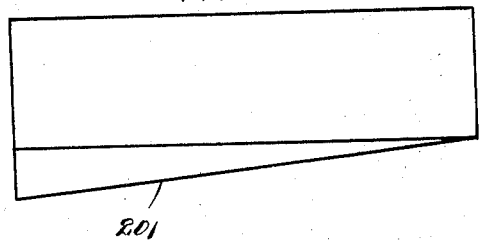
Fig. 11 is diagrammatically a longitudinal section through the casing shown in Fig. 10.

In Fig. 10 bottom 201 of the sump slants towards the one wall thereof. This bottom also slants, as indicated in Fig. 11, towards one end of the casing so as to collect the liquid in a predetermined part of the casing and to permit removal of the heavier impurities in a manner similar to that described above.

Figure 12:
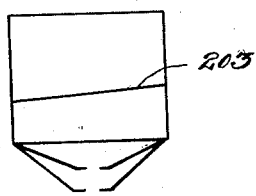
Fig. 12 is another diagrammatic section of a modified casing.

In the modification of Fig. 12 the sump below the casing is similar to the arrangement illustrated in Fig. 6. The upper bottom, however, of the casing is shown to consist of a slanting wall 203 instead of the ridge formation described.

Figure 13:
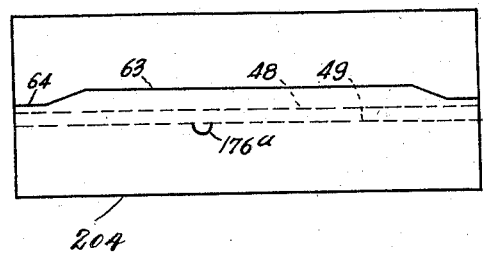
Fig. 13 is another longitudinal diagrammatical section through a modified casing.
Figure 14:
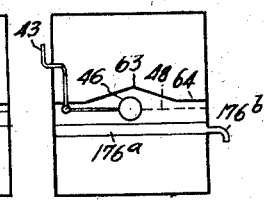
Fig. 14 is a cross-section through the same casing of Fig. 13, also shown diagrammatically.

Figs. 13 and 14 show an arrangement of a casing in which the sump has practically a flat bottom 204. A discharge pipe 176$^a$ leads at 176$^b$ out of the casing, and may terminate in the bottom portion of the extension 65, which serves for receiving the trash from the conveyor 74 (Fig. 8). The dotted lines shown in Figs. 13 and 14 indicate at 48, the water level when the machine is stationary, and at 49 the water level during the operation of the machine.

Liquid from the upper part of the compartments is conveyed into the extension 65$^a$ over a perforated wall 109 (Fig. 6), which is held between guiding ledges 110 in a slanting position near the top of the extension 65$^a$.

In the extension 65 (Fig. 8) an endless conveyor belt 67 is trained about pulleys 68 and 69, one of which is mounted on the driving shaft 70. This conveyor belt is provided over its entire width with rubber combs or brushes 66 (Fig. 1), and the belt wipes the impurities by means of these brushes or combs, along the slanting wall 73 into the upper part of the extension 65. The wall 73 is perforated, whereby the smaller impurities and liquid also carried by the wipers 66 may drip into the interior 75 of this extension. The heavier impurities, however, are thrown from the conveyor 67 by action of the wipers upon the upper strand of a conveyor 74 (Figs. 1, 7 and 8), which receives its drive through the worm 76 at the end of the shaft 70. The worm engages the worm gear 77 on the shaft 78, on which the pulley 79 is mounted. This pulley is secured to the extension 65 by means of a bracket, similar to the bracket 82 as illustrated in Fig. 2, and guiding sheaves for the conveyor belt 74 are movably disposed at 81 near the lower end of the extension 65. The conveyor 74, which is held taut by means of the idler pulley or roller 139 (Figs. 2 and 8), discharges these impurities into a box 80, having a perforated bottom 90, the space below said bottom being in communication, through a pipe 91, with the discharge pipe 95.

For the purpose of maintaining the discharge conveyor 74 in clean condition a positively driven rubber brush 83 contacts with the operative surface of this conveyor near one end of the extension 65. This rubber roller or brush 83 is mounted on a shaft 84, which, as shown in Fig. 9, carries at one end a worm gear 85 engaging a worm 86 on a shaft 87. This shaft also is equipped with a pulley 87$^a$ driven by a belt 88, which is trained over a pulley 89 on the shaft 70, the latter being driven from the main shaft 17 through a belt 72 and the pulleys 71 and 72$^a$, respectively.

Fig. 15 illustrates a modification of the interior of the extension 65. The conveyor 74, which is provided with lateral flanges, has its upper branch in a compartment formed by converging perforated plates 92, which are held in their slanting arrangement by means of angle irons or bars 93 secured to the end walls of the compartment. The foot portions of the inclined plates 92 rest on a bar 94 longitudinally of the extension.

In their conveyance through the tunnel 105 the containers are subject to the influence of air, which flows through a pipe 106, extending from the main air pipe 136. The moisture dripping from the bottles is discharged from this tunnel through the pipes 107 and 107$^a$, which drain this moisture into the casings. A baffle wall 108 is disposed in the bottom of the tunnel.

After having passed through the second casing, which is provided with the extension 65$^a$, confined by the top wall 109 and the end walls 184, and the details of which are shown in Fig. 6, the containers enter, through the tunnel 111, a compartment in which they are exposed again to the influence of atmospheric air so as to be thoroughly dried. This compartment, as shown in Fig. 3, has a slanting bottom 112 and perforated front and rear walls. The caustic fluid which may still adhere to the containers is drained through the pipe 113 to flow back into the the casing W which the containers have just left so as to be re-circulated by the pump 13.

The next compartment which the containers enter by passing through a gate in the wall 182$^a$ has a conveyor wheel 147 (Fig. 3), which receives its rinsing water supply from the pipe 143 through a branch 143$^a$, which leads into the hub of the sprocket wheel. The rinsing fluid dripping from the bottles is drained out of the compartment through a pipe 144$^a$. A spray of water is discharged against the outer surface of the containers from the head 145 at the end of a pipe which communicates with the water pipe 143. A valve 146 in this pipe serves for regulating the amount of rinsing water.

From this pre-rinsing chamber the containers enter through a gate in the wall 181 into a final rinsing chamber Z which receives its water supply through a pipe 114 from some suitable source. A branch 115 and another branch 116 of this pipe lead to the fountain sprocket wheels 152 and 153 for again cleansing the interior of the containers, while a spray head 145 in communication with the pipe 143 and controlled by a valve 146 serves for washing the outside of the containers. Openings 144 in the bottom of the compartment communicate with a drain pipe 140$^a$, which discharges through the drain pipe 140$^c$ into a gutter 97.

For maintaining the entire conveyor chain at suitable tension while it travels successively through the various compartments and through the heating boxes 123 (Figs. 1 and 2) at each end of the device an idler sprocket wheel 153$^a$ is located. This sprocket wheel is supported over a tray 117 by means of a plate 117$^a$, through which the shaft of the sprocket wheel extends. A bolt 118 is loosely connected with the plate 117 and the threaded part of the bolt is guided through a fixed nut 119, secured to the flange of the tray 117 (Fig. 3). A spring 120 is interposed between the nut and the plate 117$^a$ for yieldingly retaining thereby the plate (and the sprocket wheel carried by it) in a predetermined position with respect to the outer edge of the tray. If the bolt 118 is turned the tension of the spring 120 and the position of the plate 117$^a$ are varied, whereby the entire chain of containers is placed under more or less tension. The sag of the chain between adjacent sprocket wheels is thereby prevented and the proper positioning of the several containers with respect to the nozzle openings of the fountain sprocket wheels is assured. The drainage of the rinsing water from the tray 117 takes place through a pipe 121, as shown in Figs. 1 and 2.

The detail construction of the gates 8, through which the containers successively advance from one compartment into another, is shown in Fig. 35 as comprising a plurality of hinge plates 127, arranged in two sets, each of the sets having a pivotal axis 128$^a$. This connection is formed by a spring hinge having a tendency to maintain each set normally in closed position, but permitting each individual plate 127 of the set to be deflected from normal position in accordance with the thickness on that part of the container which in the passage of the chain through the gate comes into contact with the plate.

Figure 16:
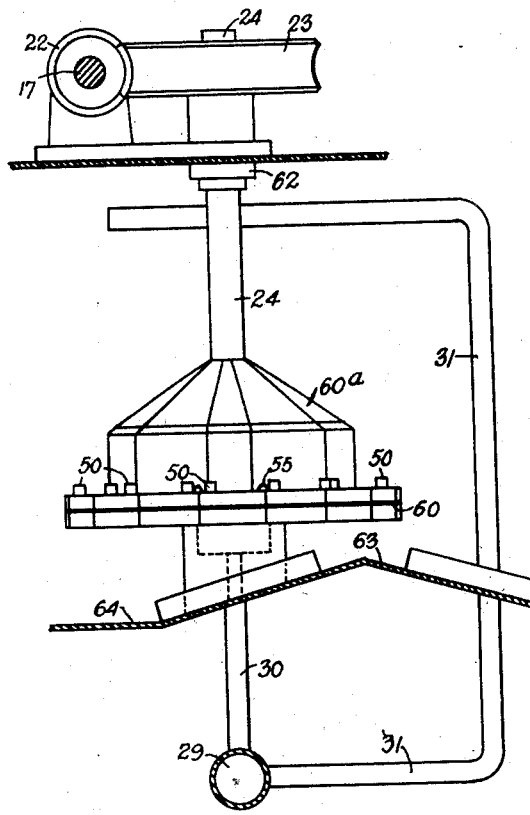
Fig. 16 is a detail elevation partly in section of one of the sprocket fountain wheels and its drive.
Figure 40:
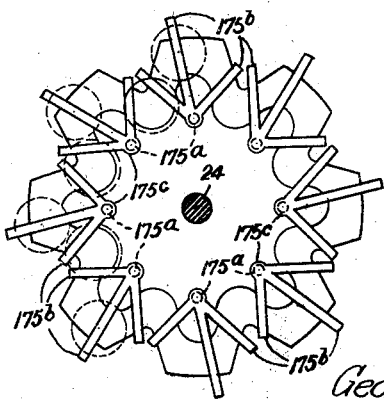
Fig. 40 is a top plan view of the fountain sprocket wheel illustrated in Fig. 39.

The detailed construction of the fountain sprocket wheeels, nozzles, and containers is shown in Figs. 16 and 40 respectively. A thrust bearing 154 (Fig. 37) is provided with an opening 151, through which the supply pipe 30, extending from the common pipe 29, projects and this central bore 151 communicates with a cylindrical recess 154$^a$ in the upper part of this casting. The lower surface is inclined so as to be seated on the inclined surface 63 of the upper bottom of the several compartments.

Figure 17:
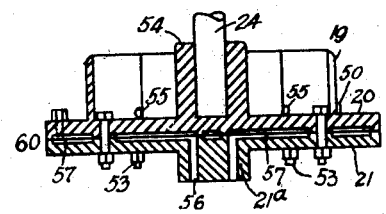
Fig. 17 is a cross-section through the wheel itself.
Figure 19:
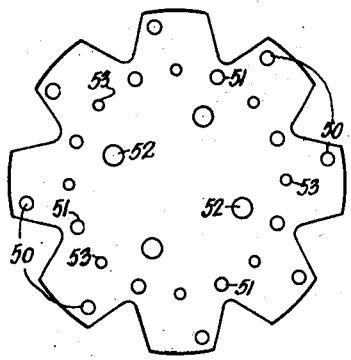
Fig. 19 is a bottom plan view of the same.
Figure 20:
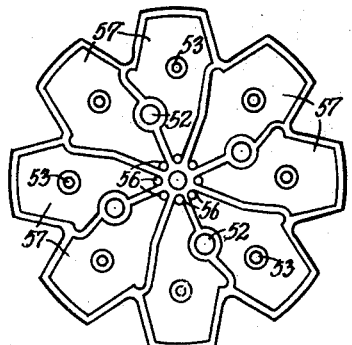
Fig. 20 is a top plan view of the lower wheel disk.

The recess 154$^a$ in the casting serves for receiving the hub 21$^a$ of a bottom plate 21 (Fig. 17), which combined with the top plate 20 forms the main structure of these fountain sprocket wheels. Each of these plates has a number of equally spaced projections serving as the teeth which engage the links of the conveyor chain, like in ordinary sprockets. Channels 56 extend parallel to the axis of the hub 21$^a$ through the same and the number of these channels preferably corresponds to the number of the teeth on the sprocket wheel (Fig. 20). On the top surface of the bottom plate 21, each of these bores 56 communicates with a chamber or recess 57 confined by a flange which extends along the circumference of the sprocket teeth and which is continued approximately in radial direction to a raised portion near the center of the top surface of the bottom plate. It will be seen, therefore, that these recesses 57 are separated from each other. The top plate 20 of the fountain sprocket wheel rests on this circumferential flange and a packing 60 may be interposed between the contacting portions of the two plates. The plates are fastened to each other by bolts 53 which are passed through bosses in the recesses 57 of the bottom plate. The top plate has a hub 54 to receive the drive shaft 24, to which the wheel is secured.

Nozzle openings 50 and 51 extend through the top plate 20 and communicate with the recesses 57 in the lower plate, whereby fluid introduced through the bores 56 under pressure will be discharged through the nozzle openings 50, 51 on top of the upper plate 20.

Figure 18:
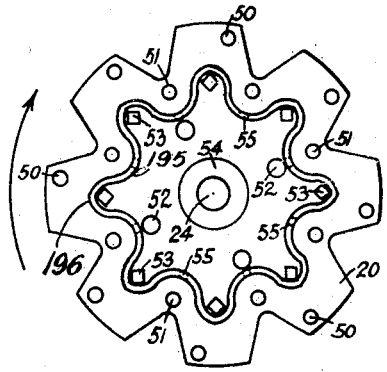
Fig. 18 is a top plan view of one of the upper disks.

The nozzle openings 50 (Fig. 18) are located near the outer edges of the teeth of the sprocket wheels while additional nozzle openings 51 are located in opposition to the central portions of the gaps between these teeth. The openings 50 are not located centrally of the projections but near the advance corner thereof. Sprocket wheels, turning in a direction opposite to the direction indicated by the arrow in Fig. 18, would have their nozzle openings 50 in the corner opposite to that in which they are shown in Fig. 18.

This arrangement of sets of pairs of nozzle openings 50 and 51 on each sprocket wheel is used on account of the peculiar conveyor link construction, which will be described below. A flange 19, projecting from the top plate upwardly, is shaped in correspondence with the link of the conveyor chain and it comprises bay portions 195 and projecting portions 196 so as to suitably support the several containers on the chain. This flange 19 is provided in the bay portions near its bottom with openings 55 to permit the drainage of the water or other fluid to the space surrounded by said flange and this fluid will then be discharged through openings 52 which openings are in register with openings 52 in the lower plate. The openings 52 are shown to be surrounded by the flange portions which separate one recess 57 from the adjacent recess.

Low nozzles may be inserted in the openings 50 and 51 and their outlets may be constructed so as to discharge the fluid in the form of a finely divided spray, as stated above, or they discharge jets as shown in Figs. 41, 41$^A$ and 41$^B$. Dependent upon the angle of the bore in these nozzles, the jet may either be straight axially, as shown at 157, or inclined as shown at 158 and 159, impinging upon the sides of the containers and thereby thoroughly cleaning the same.

Figs. 36 and 38 illustrate the top surfaces of the rigid bearings 154. The central bore 151, serving for the supply of the fluid, is in communication with the recess and with an arcuate groove 156 within said recess. During the rotation of the fountain sprocket wheels with respect to this bearing 154 a number of its channels 56 will always remain in communication with the arcuate groove.

Fig. 38 shows an arcuate groove 156, extending approximately one-fourth of a whole circle about the center of the bearing, this bearing being used for the sprocket wheels, as, for instance, 10 (Fig. 1), which are in engagement on approximately one-fourth of their circumference with the conveyor chain. The sprocket fountain wheel 10$^a$, however, which is engaged on about one-half of its circumference by the conveyor chain, may turn about a bearing 154, having the arcuate supply groove 156, as shown in Fig. 36, whereby the washing fluid is continuously supplied to one-half of all of the nozzle openings in the fountain sprocket wheel.

The modifications illustrated in Figs. 42 and 43 show bearings 154 with radial supply grooves 155 respectively for the fountain sprocket wheels, whereby the fluid is intermittently and not permanently conveyed to nozzle openings 50, 51 in the wheel during the short time in which the respective channels 56 register with these grooves.

In order to prevent pieces of broken glass and the like from falling into the space confined by the flange 19, a hood 60$^a$ is placed over this flange. The stationary pipes 31 which are not subject to the intermittent control produced by the relative movement between the bearings 148 and the hubs of the wheels, may be provided with suitable discharge openings for supplying the fluid in finely divided or in other form to the outer surface of the container.

Figure 39:
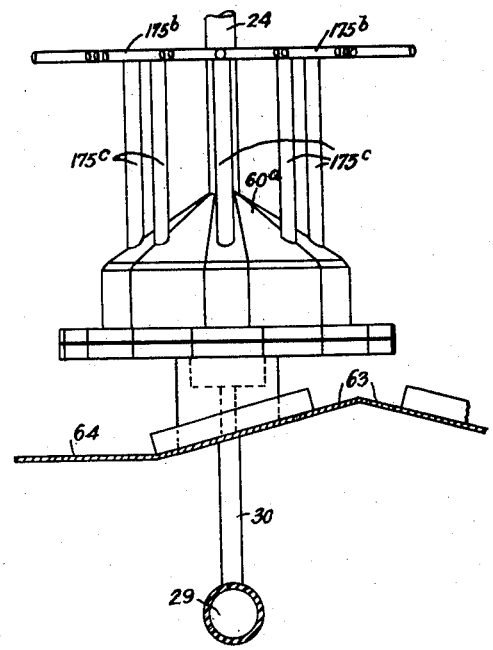
Fig. 39 is an elevation of a sprocket wheel for applying rinsing water to the bottom and bodies of the containers.

In a modification the pipes 175$^c$ (Figs. 39, 40), projecting through the hood, are through openings 175$^a$ in communication with the recesses 57 in the sprocket wheels so as to be supplied with the fluid which is also conveyed to the nozzles on the wheel. Each of these vertical pipes 175$^c$ has at its top horizontal branches 175$^b$, provided with discharge openings whereby the fluid is sprayed against the outside of the containers, and the period of feeding the fluid to the pipes 175$^c$ obviously will coincide with the period during which this fluid is supplied to the spray nozzle openings 50, 51.

The links for the conveyor shown in Figs. 22 to 32 comprise cup-shaped members terminating at their lower ends in symmetrically arranged spaced prongs 168, and the interior surface of these cups is equipped with flutings 167. The attachment of the cups to each other so as to complete a conveyor chain, as shown in Fig. 21, is effected by parallel arms 171, projecting approximately in a tangential direction from the cups and terminating in eyes 171$^a$. Lugs 170 with bores 170$^a$ at the other end of these arms 171 serve for the connection with these arms by means of a pintle 172 (Fig. 26), having a head 169 to facilitate the removal, and an opening 173 through which a cotter pin or some other locking device may be inserted.

Fig. 21 shows that the entire conveyor chain is composed of links of this character and that the cup links are alternately arranged inwardly and outwardly, thereby rendering the chain adaptable to place containers above the openings 50 and 51 of the fountain sprocket wheels.

Owing to the arrangement of the prongs 168 the low nozzles inserted in the openings 50, 51 will pass through the interspace between the prongs into the cups and then supply the fluid to the containers.

In order to render these cups suitable for the support of smaller bottles or thin necked bottles, as for instance, medicine bottles, a cylindrical sleeve 167ª (Figs. 27, 28) may be inserted into the cups and held in pre-determined position therein.

For the washing of bottles having a valve in the form of a glass ball in their necks (pop bottles) a bushing 175 (Figs. 29, 30), having a central opening 176, is inserted into the cups, and this bushing is provided with a plurality of vertical rods 174ᵇ. In positioning the bottles the rods will hold the closing ball towards the bottom and the various fluids, therefore, may freely enter the interior through the nozzles.

For larger bottles with a relatively short neck as, for instance, siphons, a sleeve 190 may be inserted into the cups (Figs. 31, 32), this sleeve being equipped with upstanding rods or wires 191ª to support the body of the bottle in a proper position. The fluid discharge from the nozzles of the sprocket fountain wheel will be projected through the central bore 192 of the sleeve and will enter the bottle.

To protect the bottles against breakage and hold them in position against the force of the jets which might possibly lift them from the cups, they may be introduced in wire cages or covers 160, provided with a bottom 160ª, as shown in Figs. 33 and 34. Various modifications of these wire covers are illustrated in Fig. 34, where one cover is shown to consist of two halves separable axially from each other and provided with a hinge 166 and a clasp 165, whereby the halves may be secured to each other in operative position after the bottle has been introduced.

The opening or closing of these clasps or latches 165 may be effected automatically by projections in the path of the containers, so that, for instance, the wire cages will be opened after arriving at a predetermined position in the return channel 122, facilitating the manual removal of the cleaned containers, and the open cages may then be closed again by another suitable projection in the neighborhood of the position at which these bottles are introduced into the machine. These automatic arrangements are not illustrated in the drawing, nor do the drawings show automatic counters.

In the operation of the machine and in carrying out the improved method, the attendant, whose position is indicated at 1 in Fig. 1, places the containers on the continuous traveling chain.

The operator ascertains from the level indicators 46 and froth detector 47 in the casings whether the casings contain a sufficient amount of fluid and from the thermometers if this fluid has the proper temperature. The various valves or caps may be opened and closed and the pressure of the pumps may be regulated in accordance with the readings of the pressure meters. The bottles are then successively placed head down in the double row of cups on the links of the container and the machine is started.

The containers are first drained before entering any one of the chambers and the impurities are discharged through the pipe 7.

In entering the first casing they pass through the chamber in which, owing to the arrangement of the grooves in the bearings 154 and 154ª, and owing to the shape of the nozzle openings intermittently finely divided sprays of warm washing water are introduced into the interior and against the exterior of the containers so as to preheat the same and to continue the removal of the impurities for facilitating the continued washing. This compartment has perforated walls in communication with the next compartment, whereby, on account of the transmission of warm mist or vapor from the next compartment, the gradual increase of temperature as desired in these containers is produced. During their passage through this compartment and through the adjacent compartments in which the warming, soaking and washing operation is continued, the trash washed out of the bottles is taken up by the conveyor 67 and carried into the extension 65 and removed from the machine.

Owing to this removal of the waste material from the washing fluid, the latter can be recirculated through the casing and be re-used repeatedly. If necessary, additional fluid may be introduced while care is being taken to maintain the temperature of the containers or of the casing at approximately 120° F. A float 46 (Fig. 16) clearly indicates the water level to the attendant.

Leaving the first casing and passing through the tunnel 105 into the second casing, the containers are exposed to drying air and this air also drives the washing fluid back into the compartment from which it has been removed. The conveyor then carries the containers into a second casing in which a treatment of the cleaned containers with a heater sterilizing fluid or caustic solution is effected. Here also means are provided for maintaining the containers at a predetermined temperature and the containers are conveyed in a serpentine path through the compartment, while the caustic solution is applied against the interior and the exterior of the various containers. The containers leave the caustic solution casing to enter a compartment in which they are exposed to the influence of atmospheric air for cooling and drying. After having been cooled, they enter a prerinsing compartment, in which they are flushed on the inside and outside with warm water, and this treatment is repeated with cold water in another compartment to which the containers are conveyed. Owing to the provision of the gates illustrated in Fig. 35, the various compartments are effectively separated from each other so as to maintain them at an even temperature and the various drainage pipes prevent the introduction of the fluid used in one compartment or casing into another casing. The containers after having been soaked, washed, sterilized, and thoroughly rinsed are then dried by heat which is conveyed by radiation from the heated compartments to the boxes 123, disposed at intervals in the return path of the containers. They may be removed at predetermined points of this return path either through devices which automatically open the wire cages or they may be removed by hand.

Dependent upon the selection of the bearings which control the intermittent supply of fluid to the nozzles of the sprocket fountain wheels, the containers may be provided with the washing fluid or caustic solution either intermittently or during the entire period during which the conveyor chain is in engagement with the sprocket fountain wheel. Again depending upon the selection of the nozzles, the jets of the washing fluid may either be thrown directly against the bottom of the container or against the sides, the vertical jets preferably alternating with the slanting jets whereby the sediment on the containers is ripped from the internal surface of the same.

In the even travel of the conveyor chain breakage and damage is eliminated particularly because the containers are seated in the solid portion of the cups integral with the resilient prong portions of the same. The fluting permits the dirt on the outside of the bottles or containers to drain out of these cups and to facilitate the treatment of the neck portions of the containers which project into the cups.

Waste of the washing fluid, the caustic solution, and the rinsing water is prevented, owing to the provision of the closed grooves in the bearings for the fountain wheels, whereby a continuous or intermittent supply only takes place to that part of the fountain wheel which is engaged by the traveling chain.

Claims:

1. In a bottle washing machine, a plurality of casings spaced from each other, a drying tunnel in the space between the casings, a conveyor carrying the containers through said casings and tunnel, and means for circulating different fluids through different casings.

2. In a bottle washing machine, a plurality of casings spaced from each other, a tunnel in the space between the casings, a conveyor carrying the containers through said casings and tunnel, means for circulating different fluids through different casings, and means for supplying a drying fluid to said tunnel.

3. In a bottle washing machine, a plurality of casings spaced from each other, a tunnel in the space between the casings, a conveyor carrying the containers through said casings and tunnel, means for circulating different fluids through different casings, and means for returning drip fluid from the channel to said casings.

4. In a bottle washing machine, a pair of casings, means for supplying a different fluid to each casing, a conveyor carrying the containers through the casings, and means for drying the containers between the two casings.

5. In a bottle washing machine, a pair of casings, means for supplying a different fluid to each casing, a conveyor carrying the containers through the casings, and means for preventing contamination of the fluid in one casing by fluid from the other casings through the containers.

6. In a bottle washing machine, a conveyor for the containers, sprocket wheels in guiding relation with the conveyor, nozzles on the wheels adapted to apply liquid to the interior of the containers, and hoods rotatable with the sprocket wheels covering the central portion of the wheels, the nozzles being located outside said hoods.

7. In a bottle washing machine, a plurality of casings, a conveyor for the containers, sprocket wheels for moving the conveyor through the casings, nozzles for applying liquid to the interior of the containers, and hoods rotatable with the sprocket wheels covering the central portion of the wheels, the nozzles being outside said hoods, and means supported by said hoods for spraying the outside of the containers which are sprayed on the inside by said nozzles.

8. In a bottle washing machine having rotary spray wheels, a conveyor actuated by said spray wheels and carrying the containers, nozzles on the wheels directed toward the inside of the containers, and means carried by the spray wheels for spraying the outside of the containers.

In testimony whereof I affix my signature in presence of two witnesses.

GEORGE CRAIG THOMSON.

Witnesses:
 ALBERT E. McADAM,
 OWEN E. MACJIE.